H. E. WARREN.
MOTOR DRIVEN ACTUATOR.
APPLICATION FILED JAN. 29, 1917.
1,262,575. Patented Apr. 9, 1918.
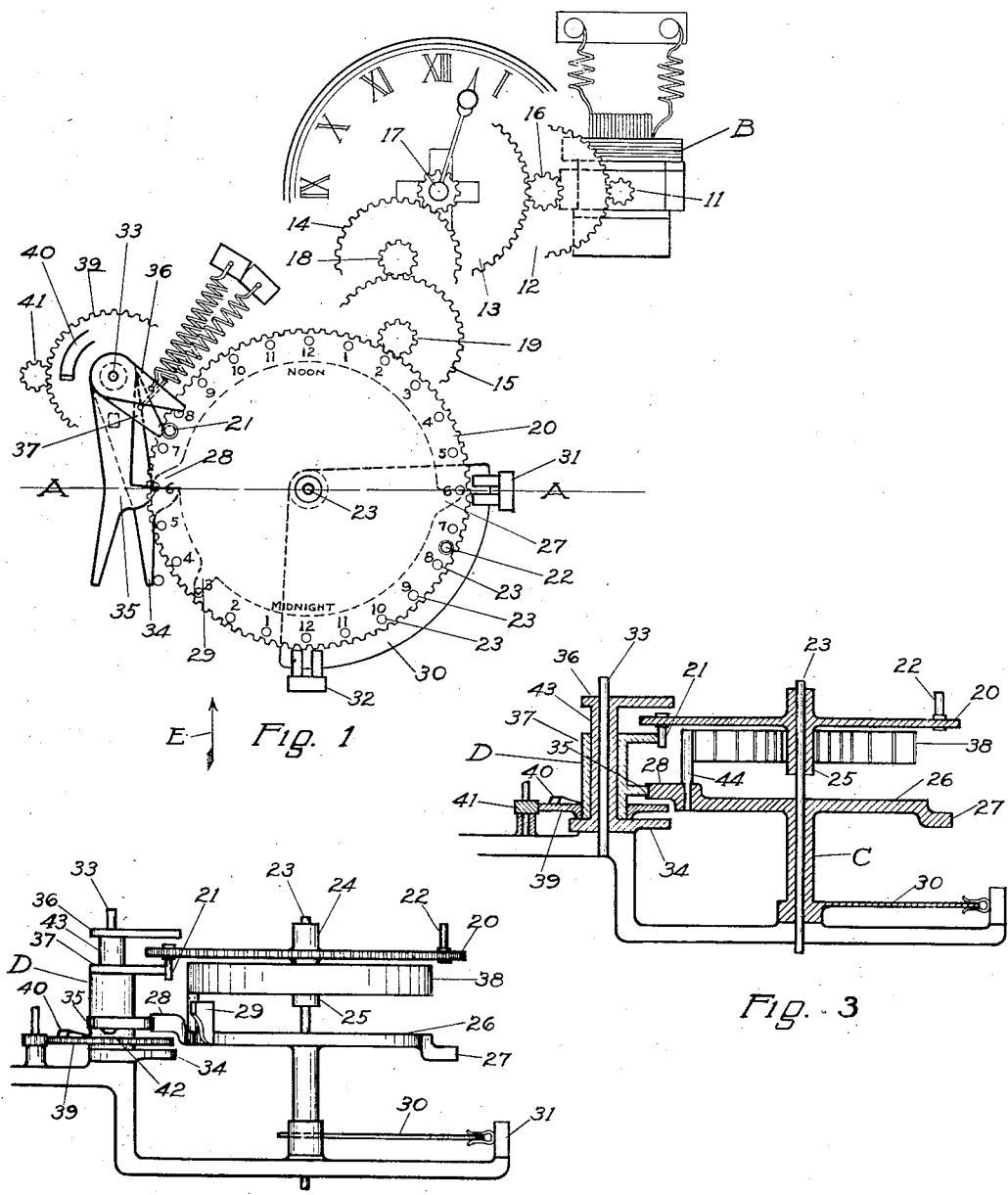
WITNESSES:
Harold L. Celunk
C. W. La Fetra
INVENTOR.
Henry E. Warren.

UNITED STATES PATENT OFFICE.

HENRY E. WARREN, OF ASHLAND, MASSACHUSETTS, ASSIGNOR TO WARREN CLOCK COMPANY, OF ASHLAND, MASSACHUSETTS, A CORPORATION OF MAINE.

MOTOR-DRIVEN ACTUATOR.

1,262,575.

Specification of Letters Patent.

Patented Apr. 9, 1918.

Application filed January 29, 1917. Serial No. 145,219.

*To all whom it may concern:*

Be it known that I, HENRY E. WARREN, a citizen of the United States, and a resident of Ashland, in the county of Middlesex and State of Massachusetts, have invented an Improvement in Motor-Driven Actuators, of which the following description, in connection with the accompanying drawings, is a specification, like characters on the drawings representing like parts.

This invention relates to time switches particularly for electric current although the device can be used equally as well for controlling other fluids such as gas or water or in fact for any purpose where sudden movement is required at certain predetermined intervals.

Figure 1 is a front elevation, Fig. 2 a view of the switch operating device looking at Fig. 1 in the direction of the arrow E and Fig. 3 is a section through Fig. 1 on the line A A. B, Fig. 1, represents an alternating current synchronous motor, such as described in my application No. 134,260, filed December 1, 1916, or No. 138,763, filed December 26, 1916, although I do not wish to be limited to any particular form of synchronous motor.

Pinion (11) which is connected by gearing with the motor, in turn drives through gears (12, 13, 14 and 15) and pinions (16, 17, 18 and 19) the dial gear (20) which may conveniently revolve once in twenty-four hours. Upon this gear which is suitably marked by numerals is a dial upon which may be fastened movable pins or projections (21 and 22) in any convenient manner. For this purpose I have shown a series of holes (23) into which the pins (21 and 22) may be forced or screwed, but slots or clamping devices of any kind would serve equally as well. Gear (20) revolves loosely on spindle (23) being prevented from axial motion by collars (24 and 25). Mounted also upon spindle (23) is a switch member (C) consisting of a bar or disk (26) with projecting teeth (27, 28 and 29), said teeth being in different planes. Fastened to (26) and rotating with it is a metal sector (30) adapted to make contact between switching points (31 and 32).

Mounted upon pivot (33) is a locking mechanism (D) for the switch consisting of dogs (34 and 35) having control arms respectively (36 and 37). Arms (36 and 37) are in the paths respectively of pins (22 and 21) so that as disk (20) revolves in a counter-clock-wise direction first one and then the other of the dogs (34 and 35) will be thrown out of the path of the projecting teeth (27, 28 and 29) of the switching member (C). Flexible connection between the disk (20) and the switching member (C) is provided by a heavy clock spring (38) and the driving pin (44) so that the gear (20) may continue its motion while switch member (C) is locked in one or another position by the dogs (34 and 35), the spring (38) meanwhile being more tightly wound so as to tend strongly to rotate (C) when the dog is released. In Fig. 1 dog (35) is holding tooth (28) so that the switch is closed, circuit being maintained between (32 and 31). Just as soon as dog (35) is released by pin (21) striking arm (37) switching member (C) will make one-half revolution and tooth (27) will then be caught by dog (34) and the switching sector (30) will have moved one-half way around and opened a circuit between (31 and 32). Circuit will remain open until pin (22) again strikes arm (36) and throws out dog (34) when circuit will be closed by sector (30) bridging over (31 and 32). Obviously this action will continue daily, the average tension of the spring (38) remaining constant, since disk (20) and member (26) both make one complete revolution each day. In order to provide a throw-out so as to prevent the device from holding the circuit closed one day in seven or at some other interval, I provide a rotating gear (39) with a cam-shaped tooth (40) driven by a pinion (41) which may be connected by a train not shown with the clock gears so that (39) will revolve once each week or at some other interval. As gear (39) revolves it will periodically bring cam (40) beneath the projection (42) of the dog (35) which having sufficient end play on the sleeve (43) will be lifted so that the dog (35) will come into the path of the tooth (29) and consequently will stop the rotation of (26) in such a position that the sector (30) will only partly bridge the gap through (31 and 32) and will then fail to make contact. Then when dog (35) is released, contact will be made and broken instantaneously as the sector revolves to its off position and the tooth (27) is caught by the dog (34). As the gear (39) continues to revolve the dog (35) will drop to its normal position so that it will miss tooth (29) the next time the switch is turned.

Claims:

1. In combination, a rotatable time element, an electric motor connected with the time element to drive same continuously, a movable device, a spring motor having one end connected with said time element and having its other end connected with said device to move the same, means coöperating with said movable device to restrain it from movement by said spring motor, and means movable with said time element for removing said device from the influence of said restraining means and permit it to be moved by the spring motor while the latter remains under the influence of the electric motor.

2. In combination, a synchronous electric motor, a rotatable time element, gearing connecting the said motor with said element to establish a definite time relation between said element and said electric motor, a movable device, a mechanical motor connected with said rotatable time element to enable said mechanical motor to be actuated continuously in one direction by said electric motor, and connected with said movable device to effect movement of the latter, and mechanism under control of said time element for causing said mechanical motor to intermittently actuate said movable device while it is being continuously acted upon by said electric motor.

3. In combination, a movable device, a mechanical motor to move it, means for holding said device from being moved by said mechanical motor, means for releasing said holding means from said movable device, a rotatable time element connected with the mechanical motor to continuously act on the same and coöperating with said releasing means to actuate the latter intermittently, and an electric motor connected with said time element to continuously move the time element and the portion of the mechanical motor connected with said time element.

4. In combination, a synchronous electric motor, a movable time element, means connecting the said motor with the said time element to establish a definite time relation between said element and said electric motor, a movable device, a mechanical motor operatively connected with the said time element to enable said mechanical motor to be actuated continuously by said electric motor and operatively connected with said movable device to effect movement of the latter, and mechanism under control of said time element for causing the said mechanical motor to intermittently actuate said movable device while it is being continuously acted upon by said electric motor.

5. In combination, a synchronous electric motor, a movable time element, means connecting the said motor with the said time element to establish a definite time relation between said element and said electric motor, a movable device, a mechanical motor operatively connected with the said time element to enable said mechanical motor to be actuated continuously by said electric motor and operatively connected with said movable device to effect movement of the latter, and mechanism adjustable with relation to said time element and under the control of the same for causing the mechanical motor to intermittently actuate said movable device and for permitting the times at which said device is moved to be readily changed.

6. In combination, a synchronous electric motor, a movable time element, means connecting the said motor with the said time element to establish a definite time relation between said element and said electric motor, a circuit controller, and means operatively connected with said time element to enable said circuit controller to be automatically opened and closed at predetermined adjustable times by energy received from said synchronous motor.

In testimony whereof, I have signed my name to this specification.

HENRY E. WARREN.